United States Patent [19]

Matsuda

[11] Patent Number: 5,369,350
[45] Date of Patent: Nov. 29, 1994

[54] OPTICAL PARALLEL RECEIVER

[75] Inventor: Kazuhiko Matsuda, Tokyo, Japan

[73] Assignee: NEC Corporation, Tokyo, Japan

[21] Appl. No.: 985,968

[22] Filed: Dec. 4, 1992

[30] Foreign Application Priority Data

Dec. 4, 1991 [JP] Japan .................. 3-319527

[51] Int. Cl.⁵ .................................. H04B 10/06
[52] U.S. Cl. .................................. 319/189; 359/194;
250/214 A; 330/59
[58] Field of Search ............... 359/157, 161, 164, 173,
359/189, 194–195; 250/214 A, 214 AG, 208.1;
330/59, 308

[56] References Cited

U.S. PATENT DOCUMENTS

| | | | |
|---|---|---|---|
| 4,282,605 | 8/1981 | Bose | 359/157 |
| 4,290,146 | 9/1981 | Adolfsson et al. | 359/161 |
| 4,651,111 | 3/1987 | Wagner et al. | 250/214 A |
| 4,730,198 | 3/1988 | Brown et al. | 385/89 |
| 5,025,456 | 6/1991 | Ota et al. | 375/76 |

FOREIGN PATENT DOCUMENTS

| | | | |
|---|---|---|---|
| 0262911 | 4/1988 | European Pat. Off. | 359/164 |
| 3833635 | 4/1990 | Germany | 359/189 |
| 0069338 | 3/1988 | Japan | 359/189 |

Primary Examiner—Richard E. Chilcot, Jr.
Assistant Examiner—K. Negash
Attorney, Agent, or Firm—Sughrue, Mion, Zinn, Macpeak & Seas

[57] ABSTRACT

An optical parallel receiver according to the present invention is provided with a plurality of photodetectors supplied with light signals, respectively, and a reference photodetector receiving a reference light signal having a constant light power equal to that of the received light signals. The reference photodetector supplies an electric signal to be used for generating a DC reference voltage signal. The DC reference voltage signal is used in all of differential amplifiers, respectively.

4 Claims, 2 Drawing Sheets

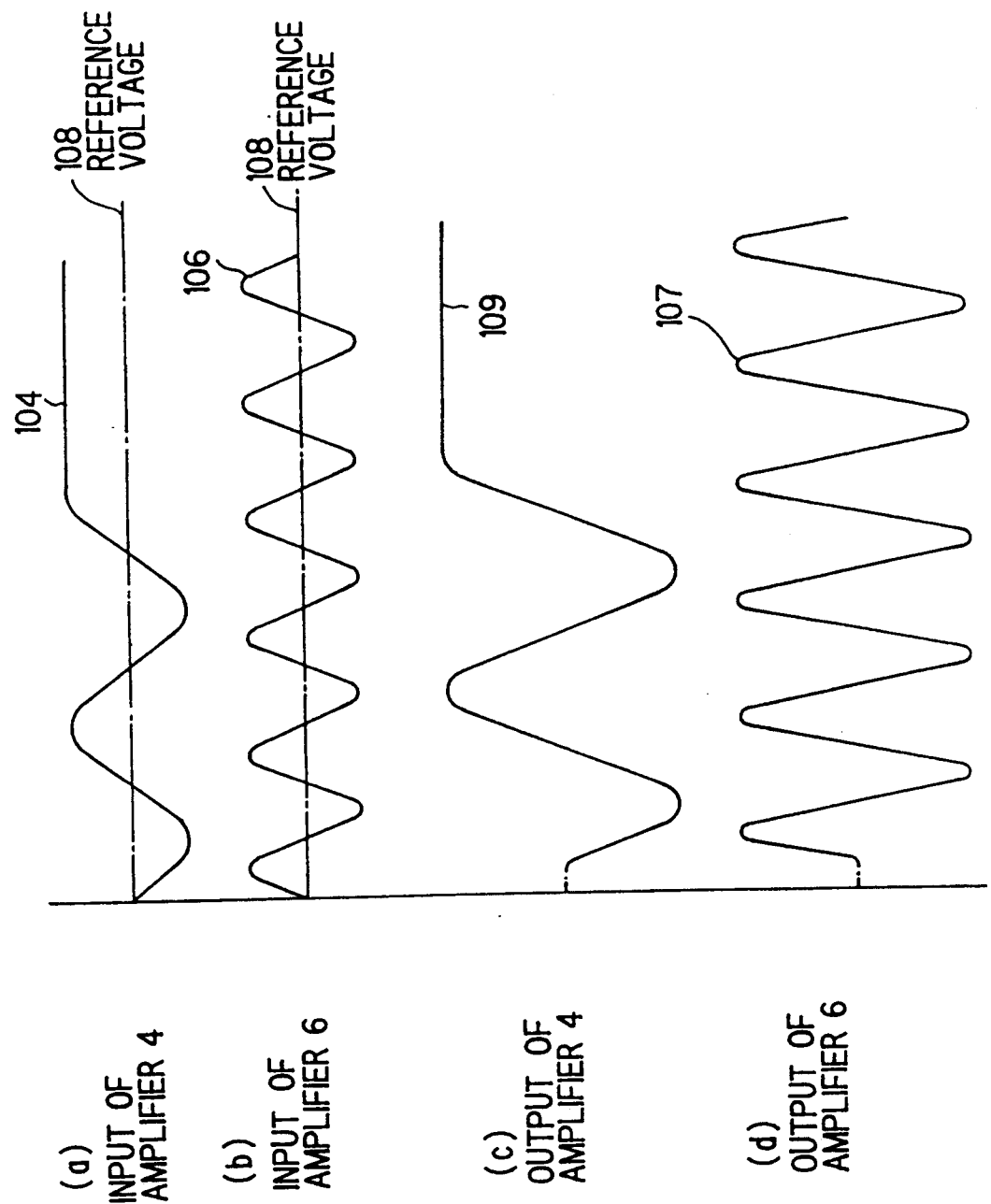

OPTICAL PARALLEL RECEIVER

FIELD OF THE INVENTION

This invention relates to an optical parallel receiver, and more particularly to, an optical parallel receiver for receiving plural light signals supplied from plural transmission lines arranged in parallel.

BACKGROUND OF THE INVENTION

A conventional optical parallel receiver includes a plurality of photodetectors for converting plural light signals, which are supplied from parallel transmission lines thereto, into electric signals, respectively, a plurality of differential amplifiers for amplifying difference voltages between the electric signals from the photodetectors and predetermined reference voltage signals, and a plurality of feedback circuits for feeding the reference voltages based on outputs of the differential amplifiers back to reference inputs of the differential amplifiers, respectively.

In this conventional optical parallel receiver, light signals are received in parallel by photodetectors to generate electric signals which are then supplied to the differential amplifiers. In each of the differential amplifiers, an electric signal is amplified by being compared to a reference voltage signal which is generated in accordance with the high and low values of the electric signal, and the differentially amplified signal is converted to a logic level signal.

According to the conventional optical parallel receiver, however, there are disadvantages in that the optical parallel receiver is large in size, because each of a differential amplifiers has the feedback circuit, and in that the reference voltage signal generated by the feedback circuit is unstable, when a received light signal continues high or low for a time, because the reference voltage signal follows the high or low input signal.

SUMMARY OF THE INVENTION

Accordingly, it is an object of the invention to provide an optical parallel receiver which is small in size and operates stably.

According to the invention, an optical parallel receiver, includes:

a plurality of signal photodetectors for receiving light signals to be converted into electric signals, respectively;

a reference photodetector for receiving a reference light signal of repetitive high and low levels having a light power approximately equal to that of the received light signals, the reference light signal being converted into electric reference signal;

a plurality of signal differential amplifiers for amplifying the electric signals from the plurality of signal photodetectors, respectively;

a reference differential amplifier for amplifying the electric reference signal from the reference photodetector; and a feedback circuit for generating a DC reference voltage signal in accordance with a difference between maximum and minimum levels of an output signal of the reference differential amplifier;

wherein the DC reference voltage signal is commonly supplied to the signal and reference differential amplifiers to be used as a common reference voltage.

The other objects and features of this invention will be understood from the following description with reference to the accompanying drawings.

BRIEF DESCRIPTION OF THE DRAWINGS

FIG. 2 is a timing chart showing waveforms of signals in operation of the first preferred embodiment.

DESCRIPTION OF THE PREFERRED EMBODIMENTS

Figure 1:
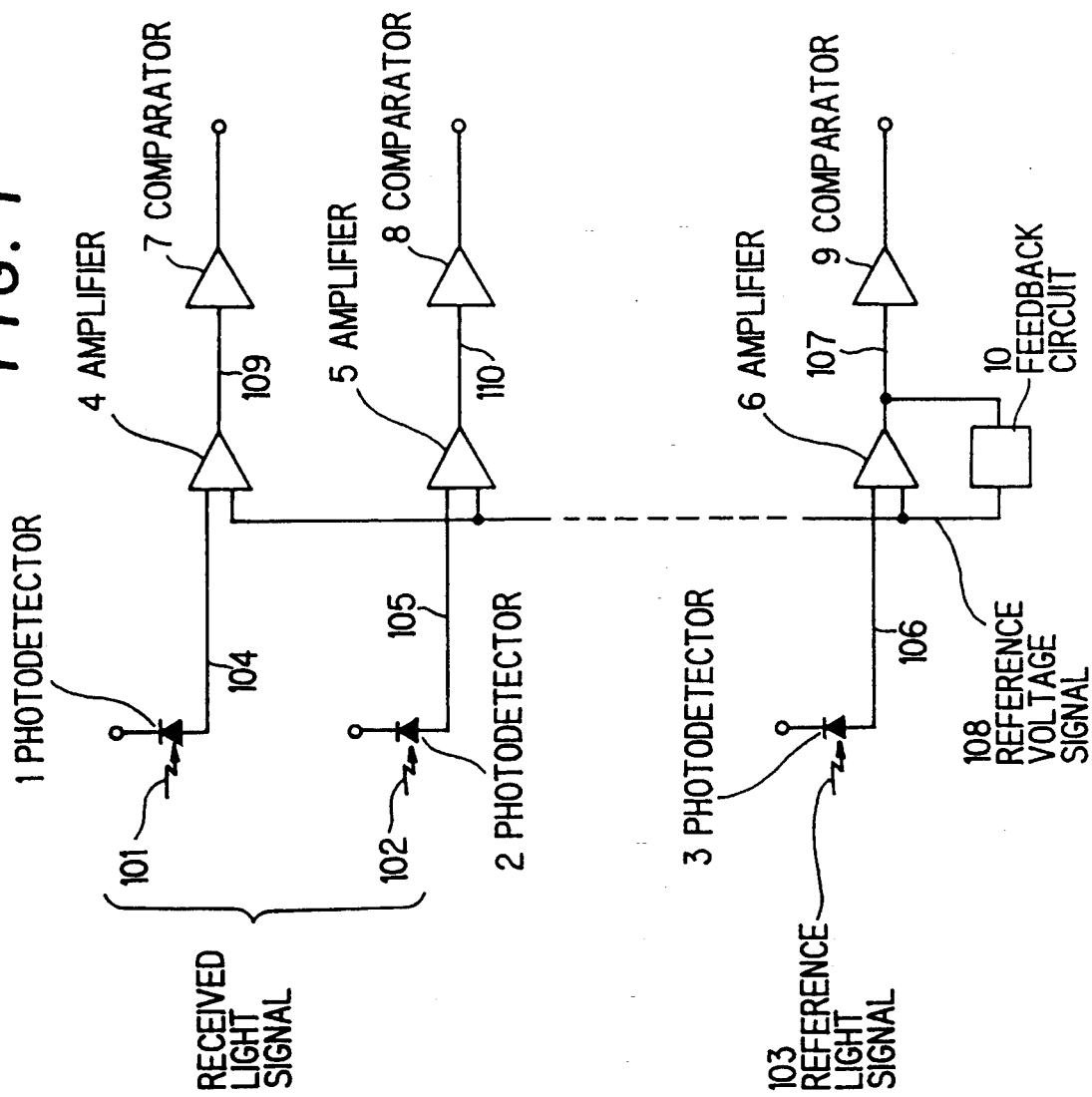
FIG. 1 is a circuit diagram illustrating an optical parallel receiver of a preferred embodiment according to the invention.

FIG. 1 shows an optical parallel receiver of a preferred embodiment according to the invention. The optical parallel receiver includes photodetectors 1 to S (the number of the photodetectors is not limited), differential amplifiers 4 to 6 connected at signal inputs to the photodetectors 1 to 3, respectively, comparators 7 to 9 connected at inputs to outputs of the differential amplifiers 4 to 6, respectively, and a common feedback circuit 10 connected to the output of the differential amplifier 6 and reference inputs of the differential amplifiers 4 to 6, respectively.

The photodetectors 1 and 2 are supplied with light signals 101 and 102 having the same light power, respectively, and the photodetector 3 is supplied with a reference light signal 103 of repetitive high and low levels having a constant light power equal to that of the received light signals 101 and 102. The feedback circuit 10 generates a DC reference voltage signal 108, which is an intermediate voltage between the maximum and minimum levels of an output signal 107 of the differential amplifier 6.

Next, operation of the preferred embodiment will be explained in conjunction with FIG. 2. The received light signals 101 and 102 and the reference light signal 103 are converted by the photodetectors 101 to 103 into electric signals 104 to 106 having wave patterns shown in FIGS. 2 (a) and (b), respectivley. The electric signals 104 to 106 are supplied to the signal inputs of the differential amplifiers 4 to 6. At this time, the differential amplifiers 4 to 6 are supplied at the reference inputs with the DC reference voltage signal 108 from the common feedback circuit 10, respectively.

The differential amplifiers 4 to 6 amplify difference voltages between the electric signals 104 to 106 and the DC reference voltage signals 108, and supply the amplified signals as output signals 109, 110 and 107, shown in FIG. 2 (c) and (d), to the comparators 7 to 9, respectively.

Then, the output signals 109, 110 and 107 of the differential amplifiers 4 to 6 are converted into logic signals in the comparators 7 to 9 in accordance with the comparison thereof with a reference level set therein, and the logic signals are supplied to the following stage, respectively.

As described above, according to the optical parallel receiver of the invention, the reference light signal 103 of the repetitive high and low levels having a constant light power is used for generating the reference voltage signal 108, so that the optical parallel receiver operates stably even if the received light signals 101 and 102 are not continued to be the same level of high or low for a consecutive time.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical parallel receiver, comprising:

a plurality of signal photodetectors for receiving light signals to be converted into electric signals, respectively;

a reference photodetector for receiving a reference light signal of repetitive high and low levels having a light power approximately equal to that of said received light signals, said reference light signal being converted into electric reference signal;

a plurality of signal differential amplifiers for amplifying said electric signals from said plurality of signal photodetectors, respectively;

a reference differential amplifier for amplifying said electric reference signal from said reference photodetector; and a feedback circuit for generating a DC reference voltage signal in accordance with a difference between maximum and minimum levels of an output signal of said reference differential amplifier;

wherein said DC reference voltage signal is commonly supplied to said signal and reference differential amplifiers to be used as a common reference voltage.

2. An optical parallel receiver, according to claim 1, further comprising:

a plurality of comparators for generating logic level signals by receiving electric signals supplied from said plurality of signal differential amplifiers and said reference differential amplifier.

3. An optical parallel receiver according to claim 1, wherein said DC reference voltage signal is an intermediate voltage between said repetitive high and low levels.

4. An optical parallel receiver according to claim 2, wherein said DC reference voltage signal is an intermediate voltage between said repetitive high and low levels.

* * * * *

UNITED STATES PATENT AND TRADEMARK OFFICE
CERTIFICATE OF CORRECTION

PATENT NO. : 5,369,350
DATED : November 29, 1994
INVENTOR(S) : Kazuhiko Matsuda

It is certified that error appears in the above-indentified patent and that said Letters Patent is hereby corrected as shown below:

Col. 2, line 16, delete "S" and insert --3--.

Signed and Sealed this

Fourth Day of April, 1995

Attest:

BRUCE LEHMAN

Attesting Officer  Commissioner of Patents and Trademarks